(12) United States Patent
Otsuka

(10) Patent No.: US 7,926,858 B2
(45) Date of Patent: Apr. 19, 2011

(54) LOCK DEVICE

(75) Inventor: Taiyou Otsuka, Kariya (JP)

(73) Assignee: Toyota Boshoku Kabushiki Kaisha, Aichi (JP)

( * ) Notice: Subject to any disclaimer, the term of this patent is extended or adjusted under 35 U.S.C. 154(b) by 650 days.

(21) Appl. No.: 11/817,544

(22) PCT Filed: Feb. 6, 2006

(86) PCT No.: PCT/JP2006/301986
§ 371 (c)(1),
(2), (4) Date: Aug. 31, 2007

(87) PCT Pub. No.: WO2006/095517
PCT Pub. Date: Sep. 14, 2006

(65) Prior Publication Data
US 2009/0056393 A1 Mar. 5, 2009

(30) Foreign Application Priority Data
Mar. 4, 2005 (JP) ................................. 2005-060658

(51) Int. Cl.
*E05C 3/06* (2006.01)
*E05C 3/16* (2006.01)
(52) U.S. Cl. ........................................ 292/216; 297/336
(58) Field of Classification Search .................. 292/216; 296/336; 297/336
See application file for complete search history.

(56) References Cited

U.S. PATENT DOCUMENTS

| 5,730,480 A | 3/1998 | Takamura |
| 5,868,444 A * | 2/1999 | Brackmann et al. .......... 292/201 |
| 6,012,747 A | 1/2000 | Takamura et al. |
| 6,945,585 B1 * | 9/2005 | Liu et al. ..................... 296/65.03 |
| 7,243,974 B2 * | 7/2007 | Kondo et al. .............. 296/65.03 |
| 7,357,436 B2 * | 4/2008 | Willing et al. ............. 296/65.03 |
| 7,475,922 B2 * | 1/2009 | Ottino et al. .................. 292/216 |
| 7,575,280 B2 * | 8/2009 | Palomba et al. ............. 297/336 |
| 2005/0212338 A1 | 9/2005 | Muller et al. |
| 2006/0181087 A1 * | 8/2006 | Wrobel ......................... 292/216 |
| 2010/0032967 A1 * | 2/2010 | Otsuka ......................... 292/240 |

FOREIGN PATENT DOCUMENTS

| DE | 19605488 | 9/1996 |
| EP | 0952288 | 10/1999 |
| JP | 2993863 B2 | 10/1999 |
| JP | 2004238841 | 8/2004 |

(Continued)

OTHER PUBLICATIONS

English language Abstract of JP 2004-238841. (date: Aug. 26, 2004).

(Continued)

*Primary Examiner* — Carlos Lugo
(74) *Attorney, Agent, or Firm* — Greenblum & Bernstein, P.L.C.

(57) ABSTRACT

A lock device that includes a lock mechanism provided on one of two members to be engaged with each other, and a striker provided on the other of the two members. The lock mechanism may include a first contact point in which a pawl contacts a hook in the unlocked condition by an elastic force of a lock spring and a second contact point in which a cam contacts the hook in the unlocked condition by an elastic force of a push spring. The hook, the pawl and the cam are arranged and constructed such that these contact points are separately set at different positions. Further, the second contact point is in a certain position.

5 Claims, 6 Drawing Sheets

FOREIGN PATENT DOCUMENTS

| | | | |
|---|---|---|---|
| JP | 3609217 | B2 | 10/2004 |
| JP | 200615892 | | 1/2006 |
| KR | 100231678 | | 9/1996 |
| WO | 2004069585 | | 8/2004 |

OTHER PUBLICATIONS

English language Abstract of JP 2006-15892. (date: Jan. 19, 2006).

* cited by examiner

LOCK DEVICE

TECHNICAL FIELD

The present invention relates to a lock device that is mainly used to lock a retractable vehicle seat to a vehicle body side or to release the lock.

BACKGROUND ART

A known example of a lock device of this type is a technique disclosed in Patent Document 1. In this technique, a striker is provided on a vehicle body side, and a lock mechanism is provided on a seat side. The lock mechanism includes a base plate having a recess capable of receiving the striker, a hook, a pawl and a cam. The hook is rotatably attached to the base plate via a shaft, so that the lock mechanism is in a locked condition in which the striker is held between the hook and the recess of the base plate or in an unlocked condition in which the hook is spaced away from the striker. The pawl and the cam are rotatably attached to the base plate via a common shaft. The pawl is held by an elastic force of a lock spring at a rotating position in which the pawl can engage the hook in the locked condition. The cam imparts a pressing force (a pushing force) in a locking direction to the hook in the locked condition by an elastic force of a push spring. As a result, a clearance between the striker and the lock mechanism in the locked condition is forcibly reduced.

FIG. 7 is a schematic view of a lock device having substantially the same function as the technique disclosed in Patent Document 1. The drawing shows the lock device that is in an unlocked condition. A hook 126 of a lock mechanism 120 is held at a rotating position in which it is spaced apart from a striker 150. In this condition, both a pressing force due to a lock spring 134 and a pressing force due to a push spring 142 acting on a pawl 130 through a cam 140 are applied to a contact point C of the hook 126 and the pawl 130. As a result of these pressing forces, at the contact point C, the hook 126 is applied with a force F in a direction of a normal with respect to the arc of the hook 126 and the pawl 130, so that the lock mechanism 120 is maintained in the unlocked condition.

Patent Document 1: International Publication No. 2004/069585

DISCLOSURE OF THE INVENTION

Problem to be Solved by the Invention

In this way, at the contact point C, the hook 126 in the unlocked condition is subjected to the pressing force due to the lock spring 134 and the pressing force due to the push spring 142. Thus, the force F applied to the hook 126 at the contact point C can be excessively increased depending on the spring forces or other such factors. As a result, a large operating load will be required for shifting the lock mechanism from the unlocked condition to the locked condition. In order to solve this drawback, for example, the spring forces can be controlled to reduce. However, the reduced spring forces may result in an insufficient engagement force between the lock mechanism 120 and the striker 150 in the locked condition.

Therefore, there is a need in the art to reduce the operating load for shifting from the unlocked condition to the locked condition without reducing in the engagement force between the striker and the lock mechanism in the locked condition.

Means for Solving the Problem

In one aspect of the present invention, a lock device is provided. The lock device includes a lock mechanism provided on one of two members to be engaged with each other, and a striker provided on the other of the two members. The lock mechanism comprises a base plate having a recess that can receive the striker, a hook rotatably attached to the base plate via a shaft, the hook, when rotated, forming a locked condition in which the striker is held between the hook and the recess of the base plate or an unlocked condition in which the hook is spaced away from the striker, a pawl rotatably attached to the base plate via a shaft, the pawl maintaining the hook in the locked condition when the pawl is rotated to a position in which the pawl can engage the hook, a lock spring provided between the hook and the pawl, the lock spring imparting a biasing force to the hook so as to bias the hook in a direction that the unlocked condition is formed, a cam rotatably supported via the shaft of the pawl so as to be coaxially rotatable with the pawl, the cam further pressing the hook in the locked condition in a locking direction, and a push spring provided between the cam and the base plate, the push spring biasing the cam so as to press the hook. A first contact point in which the pawl contacts the hook in the unlocked condition by an elastic force of the lock spring and a second contact point in which the cam contacts the hook in the unlocked condition by an elastic force of the push spring are separately set at different positions. Assuming that a value obtained by dividing a distance between a rotation center of the hook and the first contact point along a direction of a normal with respect to an arc of the hook and the pawl at the first contact point by a distance between the normal and a rotation center of the pawl is A, and that a value obtained by dividing a distance between the rotation center of the hook and the second contact point along a direction of a normal with respect to an arc of the hook and the cam at the second contact point by a distance between the normal and the rotation center of the pawl is B, the second contact point is set such that B is smaller than A.

In the present invention, the first contact point in which the pawl contacts the hook in the unlocked condition by the elastic force of the lock spring and the second contact point in which the cam contacts the hook by the elastic force of the push spring are separately set at different positions. In addition, the second contact point is set such that the pressing force applied to the hook is smaller in comparison with the case that the push spring acts on the first contact point. Therefore, an operating load for shifting from the unlocked condition to the locked condition can be reduced without reducing a locking force of the striker and the lock mechanism in the locked condition.

In another aspect of the present invention, the cam includes a deformation promoting portion. The deformation promoting portion is set such that when the load in a direction that the striker in the locked condition is disengaged from the recess of the base plate reaches a predetermined value or more, the load may promote deformation along a direction that a length between a rotation center of the cam and a pressing portion in which the cam presses the hook is reduced.

As a result, when the load in a direction that the striker in the locked condition is disengaged from the recess of the base plate reaches a predetermined value or more, the deformation promoting portion of the cam member can be deformed before any other portions contained in a transmission route thereof are deformed. Due to this deformation of the deformation promoting portion, a force for rotating the pawl in a releasing direction is interrupted, a normal locked condition in which the hook is maintained in the locked condition by the pawl can be obtained. Thus, because deformation can be concentrated to the deformation promoting portion, a portion that possibly affects maintaining the locked condition can be prevented from deforming.

In a further aspect of the present invention, the hook comprises a hook main body that is rotatably attached to the base plate via a shaft, the hook main body constituting the first contact point by contacting the pawl, and a plate constituting the second contact point by contacting the cam. The plate is coaxially supported via the shaft of the hook main body and is connected to the hook main body via a rotation preventing portion so as to rotate integrally with the hook main body.

Thus, for example, in a lock mechanism of the type in which the second contact point is not required, the hook main body can be commonly used by omitting the plate.

In a still further aspect of the present invention, the hook comprises a hook main body that is rotatably attached to the base plate via a shaft, the hook main body constituting the first contact point by contacting the pawl, and a protrusion integrally projecting from the hook main body and constituting the second contact point by contacting the cam.

In this way, because the hook main body has the protrusion constituting the second contact point, even if the lock mechanism requires the second contact point, the hook main body can be commonly used by omitting the plate depending on the type of the lock mechanism.

Figure 1:
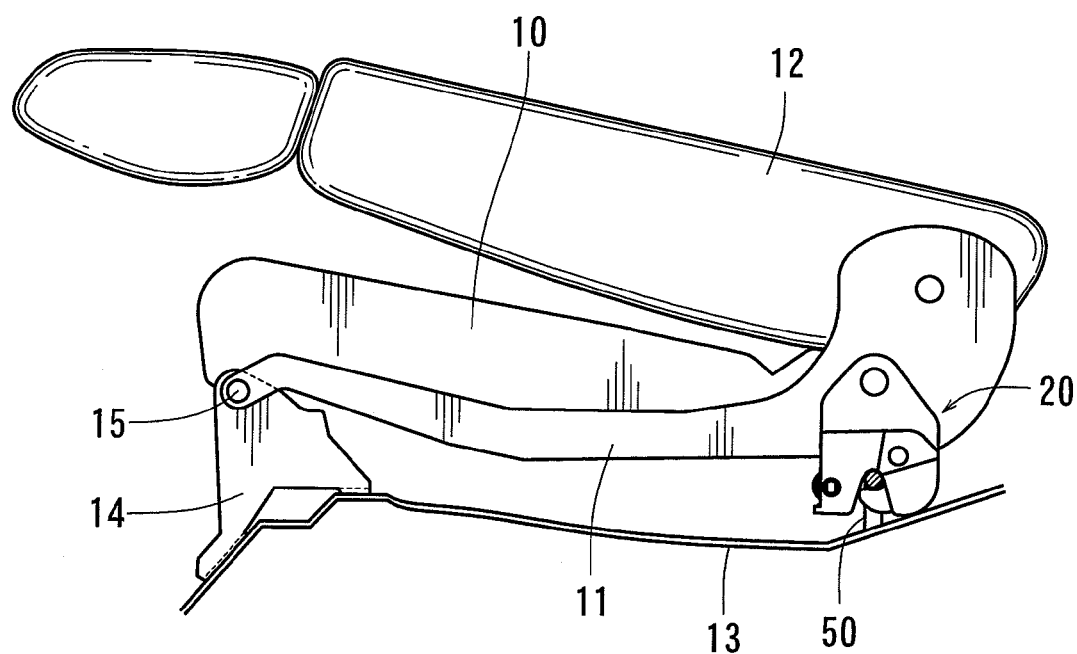
FIG. 1 is a side view of a retractable seat for a vehicle.

DESCRIPTION OF REFERENCE SYMBOLS 20 lock mechanism
22 base plate
24 recess
26 hook
30 pawl
34 lock spring
40 cam
42 push spring
50 striker
C1 first contact point
C2 second contact point
a, b distance
L1, L2 distance

BEST MODES FOR CARRYING OUT THE INVENTION

In the following, the best modes for carrying out the present invention will be described with reference to FIGS. 1 to 6.

First, a first embodiment of the present invention will be described with reference to FIGS. 1 to 5.

FIG. 1 is a side view of a retractable seat for a vehicle. In order to retract a seat of this type, a reclining device (not shown) is first operated to fold a seat back 12 onto a seat cushion 10 as shown in FIG. 1. At the same time, a lock releasing operation is performed in order to unlock a lock device that engages a rear side lower portion of the seat cushion 10 with a floor 13 side. Thereafter, the seat cushion 10 is rotated using a front side end portion thereof as a fulcrum, so that the entire seat is raised against a back surface of a front seat (not shown).

As a structure for this purpose, the front side end portion of a cushion frame 11 of the seat cushion 10 is connected to a hinge bracket 14 fixed to the floor 13 via a rotation shaft 15. Further, the lock device engaging the rear side lower portion of the cushion frame 11 with the floor 13 side is roughly divided into a lock mechanism 20 that is positioned at the rear side lower portion (one of two members) of the cushion frame 11, and a striker 50 that is fixed to the floor 13 (the other of the two members). The seat shown in FIG. 1 is, for example, a rear seat for three passengers. A connection structure that is composed of the hinge bracket 14 and the rotation shaft 15 and the lock device that is composed of the lock mechanism 20 and the striker 50 are respectively disposed on, for example, both sides of the seat.

Figure 2:
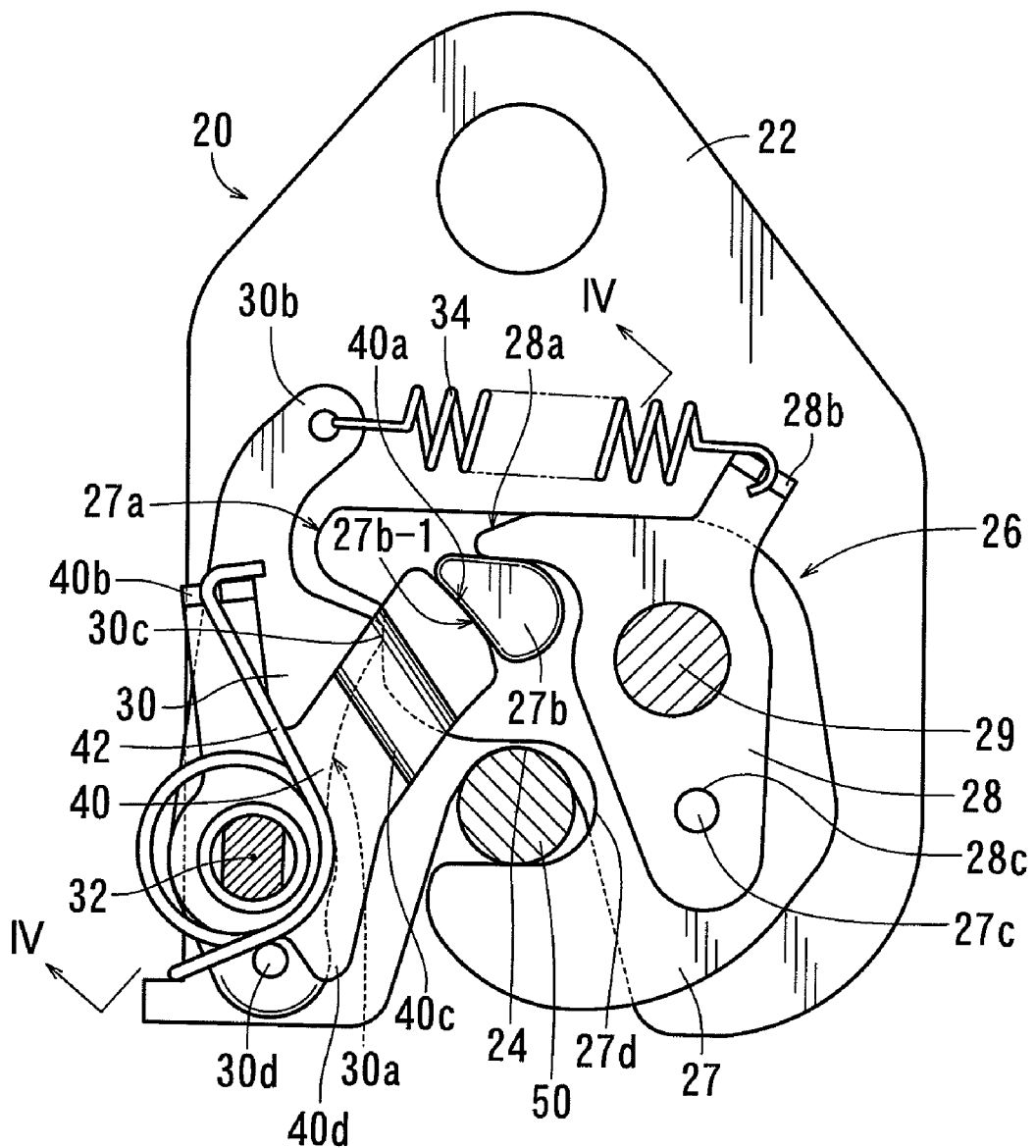
FIG. 2 is a structural view of a lock device according to a first embodiment, which illustrates a locked condition thereof.
Figure 3:
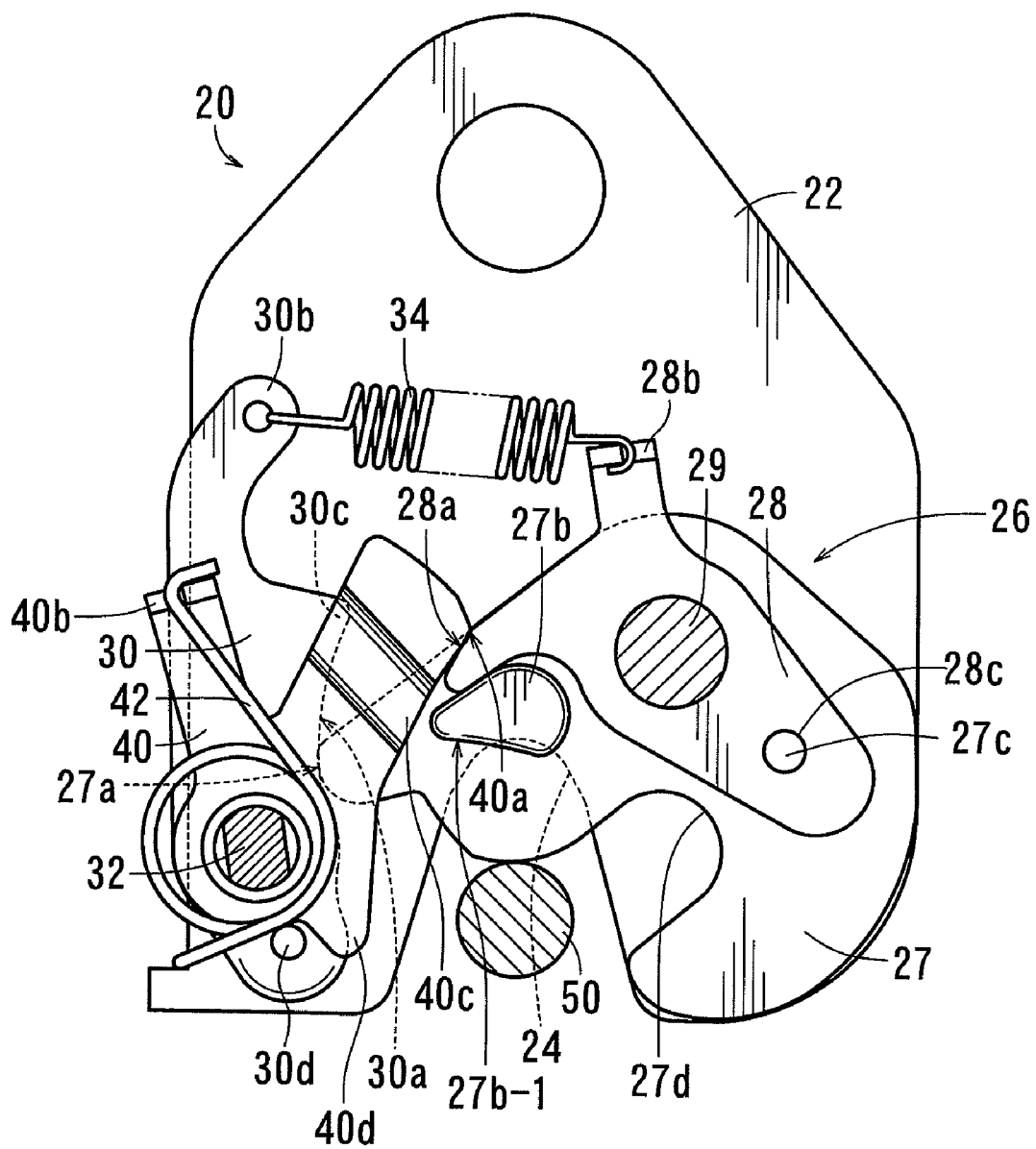
FIG. 3 is a structural view of the lock device according to the first embodiment, which illustrates an unlocked condition thereof.

FIG. 2 is a structural view of the lock device in a locked condition. FIG. 3 is a structural view of the lock device in an unlocked condition. As shown in those drawings, the lock mechanism 20 includes a base plate 22, a hook 26, a pawl 30 and a cam 40. The base plate 22 is connected to the cushion frame 11. The hook 26, the pawl 30 and the cam 40 are respectively rotatably attached to the base plate 22.

A lower portion of the base plate 22 is provided with a recess 24 that is downwardly opened. The recess 24 can receive the striker 50 from an open side thereof. An opening width of the recess is gradually increased downwardly, so as to facilitate receiving of the striker. The base plate 22 is composed of a pair of plate elements, so that the hook 26, the pawl 30 and the cam 40 are positioned between the plate elements.

The hook 26 is rotatably attached to the base plate 22 via a support shaft 29. The hook 26 is composed of a hook main body 27 and a plate 28. The hook main body 27 and the plate 28 are respectively rotatably attached to the base plate 22 via the common support shaft 29. At a position spaced apart from the support shaft 29, an engagement protrusion 27c of the hook main body 27 engages an engagement hole 28c of the plate 28. As a result, the hook main body 27 and the plate 28 are prevented from rotating with respect to each other. That is, the hook main body 27 and the plate 28 integrally rotate around an axis of the support shaft 29.

The hook main body 27 has a hook portion 27d that is opened laterally. In a condition in which the hook portion 27d engages the striker 50 that is received in the recess 24 of the base plate 22, the locked condition is obtained (FIG. 2). In this condition, the striker 50 is held between the hook portion 27d and the recess 24. In a left-hand side of the support shaft 29, the hook main body 27 has an end portion having an arcuate contact surface 27a that is formed therein. In addition, the hook main body 27 has a protrusion 27b that is positioned between the contact surface 27a and the support shaft 29. Further, the plate 28 has an arcute contact surface 28a that is positioned at an outer periphery of the protrusion 27b of the hook main body 27. In addition, the plate 28 has a spring engagement portion 28b that is outwardly projected from an outer periphery of the hook 26.

The plate 28 is a member for using the hook main body 27 as a common component in different types of lock mechanisms. Thus, in a case that the contact surface 28a and the spring engagement portion 28b are respectively formed in the hook main body 27, the plate 28 can be omitted.

The pawl 30 is rotatably attached to the base plate 22 via a support shaft 32, so as to be opposed to the hook 26 across the recess 24. The support shaft 32 can rotate integrally with the pawl 30. Thus, by performing the lock releasing operation for unlocking the lock mechanism 20, the pawl 30 can be rotated through the support shaft 32. The pawl 30 has an arcuate contact surface 30a that contacts the contact surface 27a of the hook main body 27. Also, the pawl 30 has an engagement portion 30c formed therein at a side that is opposed to the hook main body 27. Further, the pawl 30 has a spring engagement portion 30b that is positioned at an upper end portion thereof. A lock spring 34 composed of a tension spring is positioned between the spring engagement portion 30b and the spring engagement portion 28b of the hook 26 (plate 28). By the lock spring 34, the hook 26 is urged counterclockwise in FIGS. 2 and 3 and at the same time, the pawl 30 is urged clockwise.

The cam 40 is rotatably supported via the support shaft 32 of the pawl 30. That is, the cam 40 and the pawl 30 are coaxially rotatable relative to each other. The cam 40 has an arcuate contact surface 40a that is formed in an end surface of a portion thereof, which portion extends toward the hook 26. The contact surface 40a can contact a contact surface 27b-1 of the protrusion 27b of the hook main body 27 or the contact surface 28a of the plate 28. Further, the cam 40 has a spring engagement portion 40b that is formed in an end portion of a portion thereof, which portion extends substantially in the same direction as the spring engagement portion 30b of the pawl 30.

Provided on the support shaft 32 is a push spring 42 using a torsion spring. One end of the spring 42 engages the base plate 22, and the other end thereof engages the spring engagement portion 40b of the cam 40. As a result, similar to the pawl 30, the cam 40 is urged clockwise in FIGS. 2 and 3. After an end portion 40d of the cam 40 contacts a protrusion 30d of the pawl 30, a biasing force of the push spring 42 may also act on the pawl 30.

Figure 4:
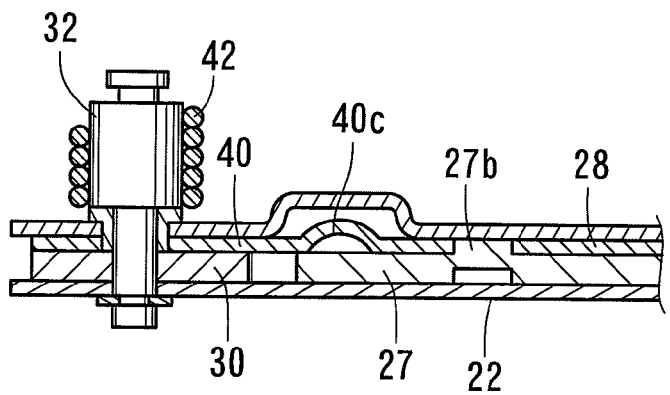
FIG. 4 is a sectional view taken along line IV-IV of FIG. 2.

FIG. 4 is a sectional view taken along line IV-IV of FIG. 2. As will be apparent from the drawing, the hook main body 27 of the hook 26 and the pawl 30 have substantially the same thickness and are arranged in substantially the same plane. Also, the plate 28 of the hook 26 and the cam 40 have substantially the same thickness and are arranged in substantially the same plane. The cam 40 has a bent portion 40c between the contact surface 40a thereof and the support shaft 32, which bent portion is swollen to a bead-like shape. The bent portion 40c is a portion that can deform with a smaller force than the other portions when a load is applied from the hook 26 side. The bent portion 40c corresponds to "a deformation promoting portion of a cam" in the present invention.

Next, a function of the lock device will be described.

First, the lock mechanism 20 is placed in the locked condition in which the striker 50 is received in the recess 24 of the base plate 22 (FIG. 2) when the seat cushion 10 is set on the floor 13 as shown in FIG. 1. In this locked condition, the hook portion 27d of the hook main body 27 of the hook 26 engages the striker 50. Conversely, due to an elastic force of the push spring 42, the cam 40 is maintained in a condition in which the contact surface 40a contacts the contact surface 27b-1 of the protrusion 27b of the hook main body 27. Due to action of the cam 40 at this time, the hook 26 is subjected to a torque clockwise as seen in FIG. 2, so that the striker 50 is pressed into the recess 24 by the hook main body 27. That is, the striker 50 is held between the recess 24 and the hook main body 27, so that a clearance between the lock mechanism 20 and the striker 50 can be eliminated.

In this way, in the locked condition, the cam 40 substantially maintains the hook 26 in the condition of FIG. 2. However, due to an elastic force of the lock spring 34, the pawl 30 is held at a position in which the engagement portion 30c can engage the hook main body 27. Therefore, when a large load is generated in a direction that the striker 50 is disengaged from the recess 24 of the base plate 22, so that the bent portion 40c of the cam 40 is deformed, the hook main body 27 contacts the engagement portion 30c of the pawl 30. As a result, a clearance elimination function for eliminating the clearance between the lock mechanism 20 and the striker 50 is canceled. However, the lock mechanism 20 is maintained in the locked condition by the pawl 30. In this way, when a load having a predetermined value or more is exerted between the lock mechanism 20 and the striker 50 in the locked condition, the bent portion 40c of the cam 40 can be deformed before any other portions contained in a transmission route thereof are deformed. As a result, fatal portions of the lock mechanism 20 can be prevented from deforming, thereby maintaining at least the original lock function.

When the lock device is in the unlocked condition, the hook 26 is maintained at a rotating position shown in FIG. 3 due to the elastic force of the lock spring 34. That is, in the unlocked condition, due to the elastic force of the lock spring 34, the hook portion 27d of the hook main body 27 is spaced away from the striker 50, and the contact surface 27a of the hook main body 27 contacts the contact surface 30a of the pawl 30. Further, due to the elastic force of the push spring 42, the contact surface 40a of the cam 40 contacts the contact surface 28a of the plate 28 of the hook 26.

Figure 5:
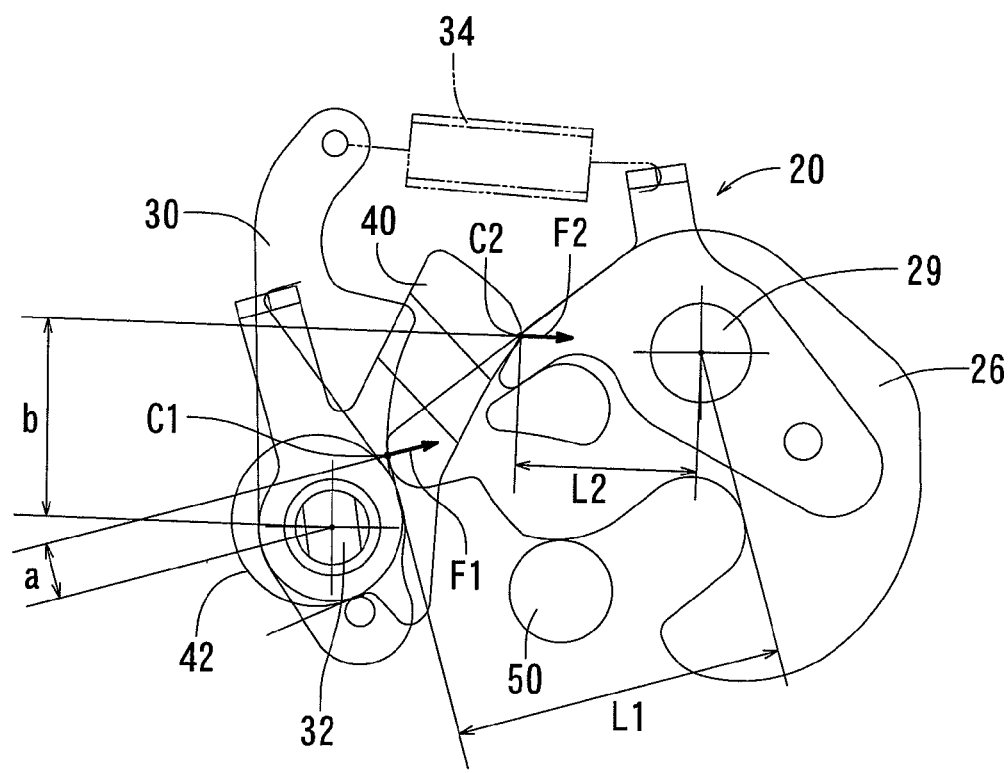
FIG. 5 is a skeletal view of the lock device according to the first embodiment, which illustrates the unlocked condition thereof.

FIG. 5 is a skeletal view of the lock device, which illustrates the unlocked condition thereof similar to FIG. 3. In FIG. 5, a contact point between the contact surface 27a of the hook main body 27 and the contact surface 30a of the pawl 30 shown in FIG. 3 will be referred to as a first contact point C1, and a contact point between the contact surface 28a of the plate 28 and the contact surface 40a of the cam 40 will be referred to as a second contact point C2. Further, at the first contact point C1, a force in a direction of a normal with respect to the arc of the contact surfaces 27a and 30a will be referred to as a force F1, and at the second contact point C2, a force in a direction of a normal with respect to the arc of the contact surfaces 28a and 40a will be referred to as a force F2. Further, a distance between an axis center of the support shaft 29 and the first contact point C1 along the direction of the normal corresponding to the force F1 will be referred to as L1, and a distance between this normal and an axis center of the support shaft 32 will be referred to as a. Similarly, a distance between the axis center of the support shaft 29 and the second contact point C2 along the direction of the normal corresponding to the force F2 will be referred to as L2, and a distance between this normal and the axis center of the support shaft 32 will be referred to as b. Further, the first contact point C1 is positioned at the same position as the contact point C in FIG. 7.

The forces F1 and F2 can be expressed by Equations 1 and 2 as follows.

$$F1 = T1/a \qquad \text{[Equation 1]}$$

$$F2 = T2/b \qquad \text{[Equation 2]}$$

Wherein, T1 is a torque of the lock spring 34, and T2 is a torque of the push spring 42.

In addition, the resistance torque R1 when the hook 26 in the unlocked condition is rotated toward the locked condition can be obtained by Equation 3.

$$R1 = T1/a \times \mu \times L1 + T2/b \times \mu \times L2 \quad \text{[Equation 3]}$$

Wherein μ is the coefficient of friction at the first contact point C1 and the second contact point C2.

Figure 7:
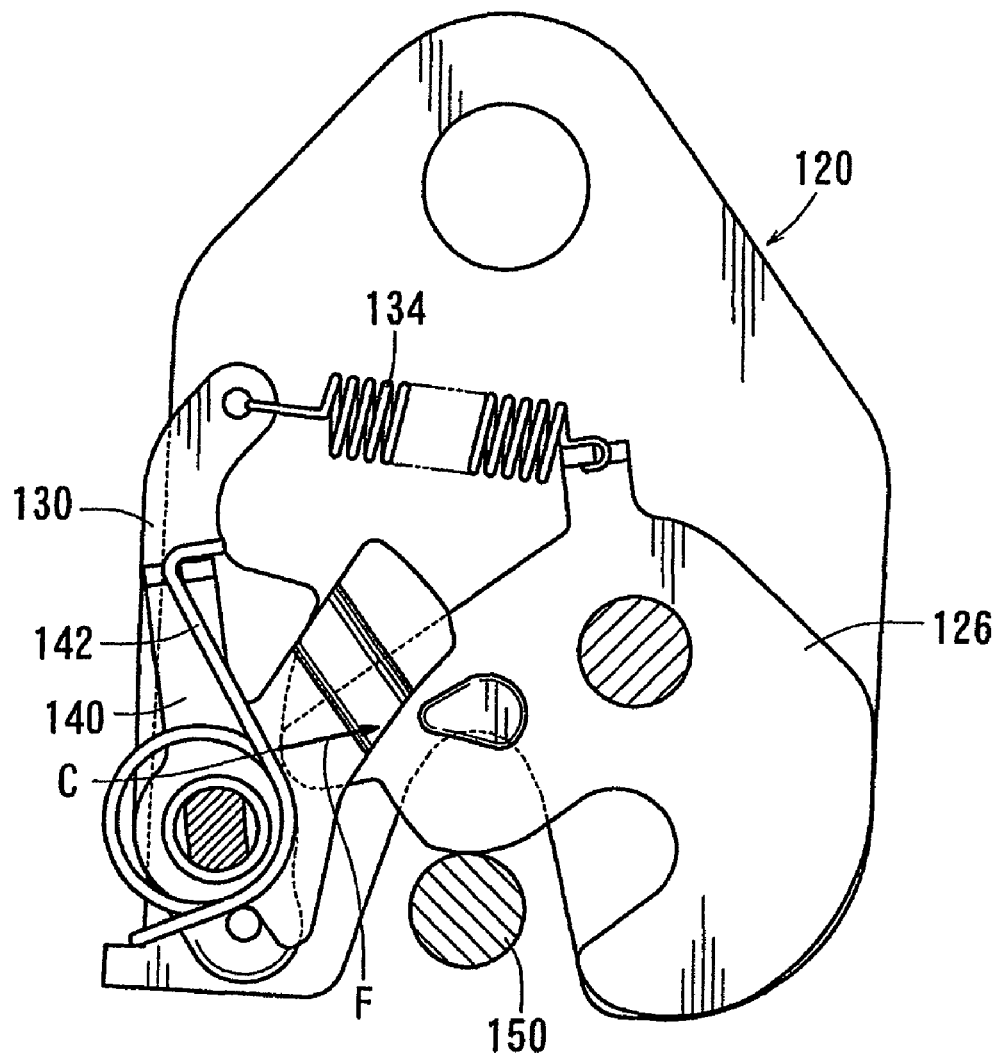
FIG. 7 is a structural view of a conventional lock device.

Further, because the contact point C in the lock device shown in FIG. 7 is positioned at the same position as the first contact point C1 in FIG. 5, the resistance torque R2 of the hook 126 when it is rotated from the unlocked condition to the locked condition can be expressed by Equation 4.

$$R2 = T1/a \times \mu \times L1 + T2/a \times \mu \times L1 \quad \text{[Equation 4]}$$

For the resistance torque R1 of Equation 3 to be smaller than the resistance torque R2 of Equation 4, it is simply necessary that the value obtained by subtracting R2 from R1 as shown in Equation 5 is a negative value (−).

$$R1 - R2 = T2\mu \times (L2/b - L1/a) \quad \text{[Equation 5]}$$

In Equation 5, "T2μ" is a coefficient, and assuming that the value obtained from this equation is a negative value (−), Equation 6 can be derived.

$$L2/b - L1/a < 0 \rightarrow L2/b < L1/a \quad \text{[Equation 6]}$$

In Equation 6, assuming that (L1/a=A) and (L2/b=B), when the second contact point C2 is set such that (A>B), it is possible to reduce the resistance torque R1.

Thus, in the lock mechanism 20, the first contact point C1 subjected to the elastic force of the lock spring 34 and the second contact point C2 subjected to the elastic force of the push spring 42 are separately set, and the second contact point C2 is set such that the pressing force applied to the hook 26 is smaller in comparison with the case that the push spring acts on the first contact point C1. As a result, an operating load for shifting from the unlocked condition to the locked condition can be reduced without reducing a locking force of the lock mechanism 20 and the striker 50 in the locked condition.

Next, a second embodiment of the present invention will be described with reference to FIG. 6.

Figure 6:
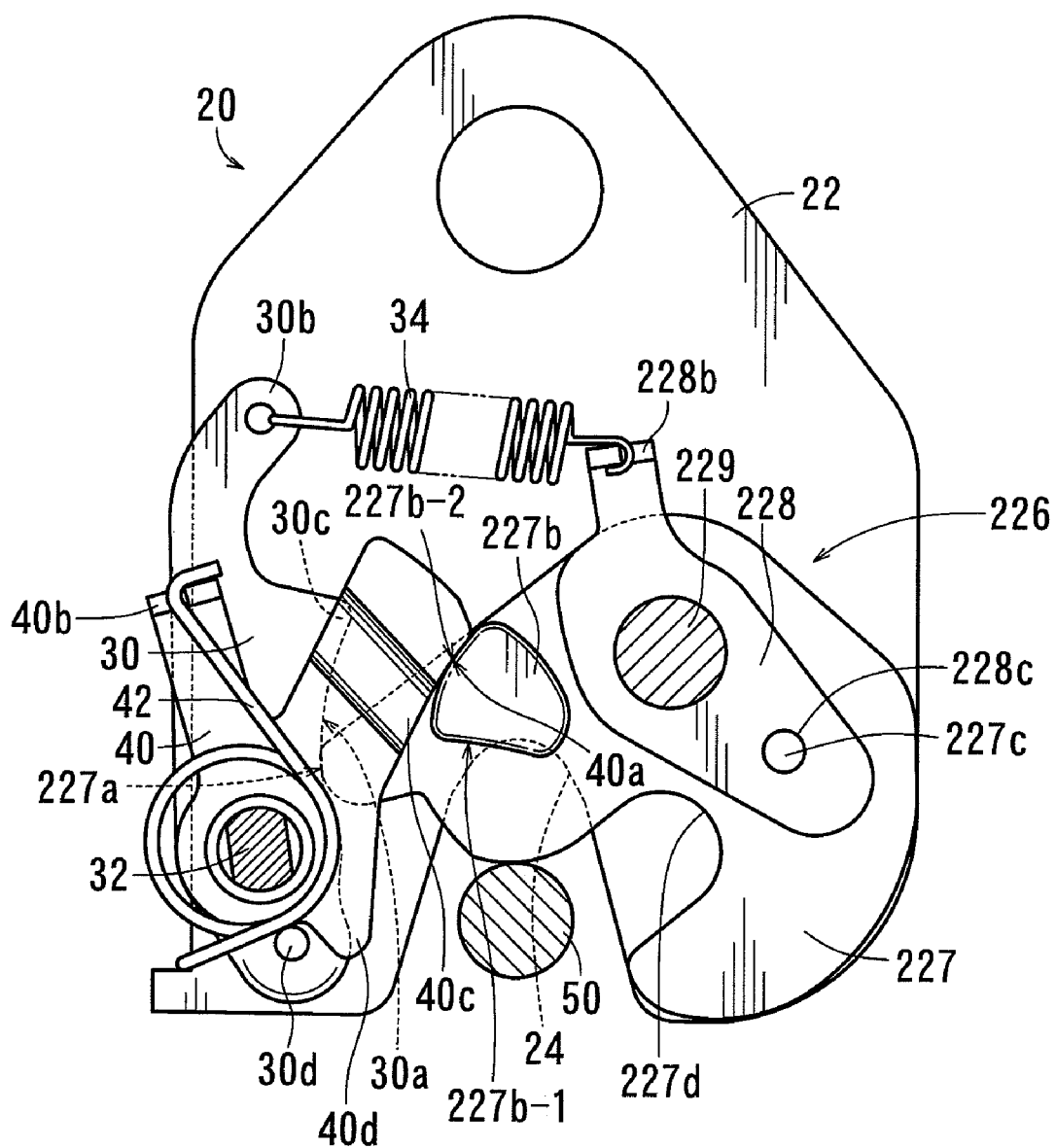
FIG. 6 is a structural view of a lock device according to a second embodiment, which illustrates an unlocked condition thereof.

FIG. 6 is a structural view of a lock device according to a second embodiment, which illustrates an unlocked condition thereof. As shown in the drawing, a hook 226 of the second embodiment is composed of a hook main body 227 and a plate 228. The hook main body 227 and the plate 228 are rotatably supported on the base plate 22 via by a common support shaft 229. In addition, an engagement protrusion 227c of the hook main body 227 engages an engagement hole 228c of the plate 228, so that the hook main body and the plate are prevented from rotating with respect to each other.

The hook main body 227 has an arcuate contact surface 227a, a protrusion 227b and a hook portion 227d that is opened laterally. The plate 228 has a spring engagement portion 228b that is outwardly projected from an outer periphery of the hook 226. The construction and function as described above are the same as the hook 26 of the first embodiment except that configurations of the protrusion 227b of the hook main body 227 and the plate 228 are respectively changed. Thus, changes in the configurations of the protrusion 227b and the plate 228 will be described.

First, the plate 228 does not have a portion corresponding to the portion having the contact surface 28a of the plate 28 of the first embodiment. Instead, the protrusion 227b has a contact surface 227b-2 that has the same configuration as the contact surface 28a of the plate 28. A contact surface 227b-1 (a lower surface in the drawing) of the protrusion 227b opposite to the contact surface 227b-2 is formed so as to have the same configuration as the contact surface 27b-1 of the protrusion 27b in the first embodiment. As the first embodiment, when the lock device is in the locked condition, the contact surface 227b-1 is maintained in a condition in which it contacts the contact surface 40a of the cam 40. On the contrary, when the lock device is in the unlocked condition, the contact surface 40a of the cam 40 is maintained in a condition in which it contacts the contact surface 227b-2 of the protrusion 227b, as shown in FIG. 6.

That is, in the second embodiment, a contact point between the contact surface 227b-2 of the protrusion 227b and the contact surface 40a of the cam 40 corresponds to the second contact point C2. Thus, because the second contact point C2 is formed by the protrusion 227b of the hook main body 227, even when the plate 228 is omitted, the hook main body 227 can be commonly used, thereby providing the lock mechanism 20 having the second contact point C2. As described in the first embodiment, the plate 228 is a member for using the hook main body 227 as a common component in different types of lock mechanisms. The plate thus constructed can be easily omitted.

The preferred embodiments for carrying out the invention have been described with reference to the drawings. However, these embodiments can be easily changed or modified without departing from the gist of the present invention.

For example, in the first and second embodiments, the seat cushion 10 of the retractable seat and the floor 13 are exemplified as the two members that respectively have the lock mechanism 20 and the striker 50. However, the seat cushion 10 and the floor 13 can be replaced with any two members that require locking and unlocking by the lock device.

What is claimed is:

1. A lock device, comprising:
a lock mechanism provided on one of two members to be engaged with each other; and
a striker provided on the other of the two members,
wherein the lock mechanism comprises a base plate having a recess that can receive the striker;
a hook rotatably attached to the base plate via a shaft, the hook, when rotated, forming a locked condition in which the striker is held between the hook and the recess of the base plate or an unlocked condition in which the hook is spaced away from the striker;
a pawl rotatably attached to the base plate via a shaft, the pawl maintaining the hook in the locked condition when the pawl is rotated to a position in which the pawl can engage the hook;
a lock spring provided between the hook and the pawl, the lock spring imparting a biasing force to the hook so as to bias the hook in a direction that the unlocked condition is formed;
a cam rotatably supported via the shaft of the pawl so as to be coaxially rotatable with the pawl, the cam further pressing the hook in the locked condition in a locking direction; and
a push spring provided between the cam and the base plate, the push spring biasing the cam so as to press the hook,
wherein the hook, the pawl and the cam are arranged and constructed such that a first contact point in which the pawl contacts the hook in the unlocked condition by an elastic force of the lock spring and a second contact point in which the cam contacts the hook in the unlocked condition by an elastic force of the push spring are separately set at different positions,
wherein the second contact point is set such that a value B is smaller than a value A when the value A corresponds to a value obtained by dividing a distance between a rotation center of the hook and the first contact point along a direction of a normal with respect to an arc of the hook and the pawl at the first contact point by a distance between the normal and a rotation center of the pawl, and when the value B corresponds to a value obtained by dividing a distance between the rotation center of the hook and the second contact point along a direction of a normal with respect to an arc of the hook and the cam at the second contact point by a distance between the normal and the rotation center of the pawl, wherein the hook comprises a hook main body that is rotatably attached to the base plate via a shaft, the hook main body constituting the first contact point by contacting the pawl, and a plate constituting the second contact point by contacting the cam, and wherein the plate is coaxially supported via the shaft of the hook main body and is connected to the hook main body via a rotation preventing portion so as to rotate integrally with the hook main body.

2. The lock device as defined in claim 1, wherein the cam comprises a deformation promoting portion, wherein the deformation promoting portion is set such that when the load in a direction that the striker in the locked condition is disengaged from the recess of the base plate reaches a predetermined value or more, the load may promote deformation along a direction that a length between a rotation center of the cam and a pressing portion in which the cam presses the hook is reduced.

3. The lock device as defined in claim 2, wherein the hook further comprises a protrusion integrally projecting from the hook main body.

4. The lock device as defined in claim 1, wherein the hook further comprises a protrusion integrally projecting from the hook main body.

5. A lock device, comprising:
a lock mechanism provided on one of two members to be engaged with each other; and
a striker provided on the other of the two members,
wherein the lock mechanism comprises a base plate having a recess that can receive the striker;
a hook rotatably attached to the base plate via a shaft, the hook, when rotated, forming a locked condition in which the striker is held between the hook and the recess of the base plate or an unlocked condition in which the hook is spaced away from the striker;
a pawl rotatably attached to the base plate via a shaft, the pawl maintaining the hook in the locked condition when the pawl is rotated to a position in which the pawl can engage the hook;
a lock spring provided between the hook and the pawl, the lock spring imparting a biasing force to the hook so as to bias the hook in a direction that the unlocked condition is formed;
a cam rotatably supported via the shaft of the pawl so as to be coaxially rotatable with the pawl, the cam further pressing the hook in the locked condition in a locking direction; and
a push spring provided between the cam and the base plate, the push spring biasing the cam so as to press the hook,
wherein the hook, the pawl and the cam are arranged and constructed such that a first contact point in which the pawl contacts the hook in the unlocked condition by an elastic force of the lock spring and a second contact point in which the cam contacts the hook in the unlocked condition by an elastic force of the push spring are separately set at different positions,
wherein the second contact point is set such that a value B is smaller than a value A when the value A corresponds to a value obtained by dividing a distance between a rotation center of the hook and the first contact point along a direction of a normal with respect to an arc of the hook and the pawl at the first contact point by a distance between the normal and a rotation center of the pawl, and when the value B corresponds to a value obtained by dividing a distance between the rotation center of the hook and the second contact point along a direction of a normal with respect to an arc of the hook and the cam at the second contact point by a distance between the normal and the rotation center of the pawl,
wherein the cam comprises a deformation promoting portion,
wherein the deformation promoting portion is set such that when the load in a direction that the striker in the locked condition is disengaged from the recess of the base plate reaches a predetermined value or more, the load may promote deformation along a direction that a length between a rotation center of the cam and a pressing portion in which the cam presses the hook is reduced,
wherein the hook comprises a hook main body that is rotatably attached to the base plate via a shaft, the hook main body constituting the first contact point by contacting the pawl, and a plate constituting the second contact point by contacting the cam, and
wherein the plate is coaxially supported via the shaft of the hook main body and is connected to the hook main body via a rotation preventing portion so as to rotate integrally with the hook main body.

* * * * *